United States Patent
Morino (10) Patent No.: US 7,358,990 B2
(45) Date of Patent: Apr. 15, 2008

(54) IMAGE-TAKING APPARATUS CAPABLE OF SAVING IMAGE DATA FILES IN FOLDER ON RECORDING MEDIUM

(75) Inventor: Takashi Morino, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 903 days.

(21) Appl. No.: 10/287,122

(22) Filed: Nov. 4, 2002

(65) Prior Publication Data
US 2003/0088557 A1 May 8, 2003

(30) Foreign Application Priority Data
Nov. 8, 2001 (JP) .............................. 2001-343422

(51) Int. Cl.
*H04N 5/76* (2006.01)
*G06F 12/08* (2006.01)

(52) U.S. Cl. .................................... 348/231.2; 711/117
(58) Field of Classification Search ............. 348/231.2, 348/231.99, 207.1, 231.7, 231.8; 396/321; 711/117
See application file for complete search history.

(56) References Cited

U.S. PATENT DOCUMENTS

| | | | | |
|---|---|---|---|---|
| 5,861,918 A | * | 1/1999 | Anderson et al. | 348/231.9 |
| 6,507,363 B1 | * | 1/2003 | Anderson et al. | 348/231.9 |
| 6,704,047 B1 | * | 3/2004 | Tsutsui | 348/231.2 |
| 6,816,189 B2 | * | 11/2004 | Nagaoka et al. | 348/231.2 |
| 6,829,624 B2 | * | 12/2004 | Yoshida | 348/231.4 |
| 6,900,912 B1 | * | 5/2005 | Miyake | 348/231.2 |
| 7,269,335 B2 | * | 9/2007 | Okamoto et al. | 386/95 |
| 2002/0015100 A1 | * | 2/2002 | Shioji | 348/231 |
| 2002/0018656 A1 | * | 2/2002 | Shioji | 396/661 |
| 2004/0267793 A1 | * | 12/2004 | Sato | 707/100 |
| 2005/0052549 A1 | * | 3/2005 | Schinner et al. | 348/231.2 |
| 2006/0098105 A1 | * | 5/2006 | Okisu et al. | 348/231.99 |
| 2007/0014543 A1 | * | 1/2007 | Nakase et al. | 386/107 |
| 2007/0260809 A1 | * | 11/2007 | Hara et al. | 711/101 |

FOREIGN PATENT DOCUMENTS

| | | | |
|---|---|---|---|
| JP | 09098367 A | * | 4/1997 |
| JP | 2001169222 A | * | 6/2001 |
| JP | 2003150929 A | * | 5/2003 |

OTHER PUBLICATIONS

Official Translation of Japanese Publ. No. 2001-169222-A.*

* cited by examiner

*Primary Examiner*—John M. Villecco
(74) *Attorney, Agent, or Firm*—Cowan, Liebowitz & Latman, P.C.

(57) ABSTRACT

An image-taking apparatus preferable for saving image data in folders as desired by a user for each scene or date of image-taking is disclosed. The image-taking apparatus of the present invention comprises an image processing circuit which creates image data files based on output from an image-pickup device, and a filing system which saves created image data files in a folder created on a recording medium with a different file number assigned to each image data file and performs a numbering process in which it assigns file numbers sequentially from an initial number. The filing system creates a new folder on the recording medium in accordance with operation of an operating member by a user and starts the numbering process on image data files to be saved in the new folder from the initial number.

2 Claims, 9 Drawing Sheets

IMAGE-TAKING APPARATUS CAPABLE OF SAVING IMAGE DATA FILES IN FOLDER ON RECORDING MEDIUM

BACKGROUND OF THE INVENTION

1. Field of the Invention

The present invention relates to an image-taking apparatus, an image-taking method, and an image-taking program which records a file of the data of the taken image (image data) on a storage medium with a file number given to the image data.

2. Description of the Related Art

In an image-taking apparatus such as a digital camera, a large amount of image data can be recorded and saved on a high capacity removable storage medium in recent years. For this reason, a filing system is important for determining what kinds of file naming rule and folder configuration are used to record data.

For example, organizing taken images at a later time requires a file naming rule which defines the order of image-taking, and classifying images by scenes or dates of image-taking requires a folder configuration which allows taken images to be recorded separately for each folder. In addition, the use of serial numbers in each camera enables specific file names to be given to files even when a folder for saving the files is changed or a recording medium is replaced.

However, each camera has conventionally employed its own filing system to present a problem of compatibility when a storage medium used in a camera is to be used in another camera.

To address the problem, JEIDA (Japanese Electronic Industry Development Association) has set the DCF (Design rule for Camera File system) standard in which folder numbers and file numbers are introduced to folder and file naming rules, thereby allowing filing which achieves the aforementioned functions and solving the problem of compatibility. Most of recent digital cameras comply with the DCF standard.

The file naming rule with numbering, however, involves a limitation on numbers. For example, the DCF standard defines a format in which a folder name is represented as "*FOLDER" (* is a folder number and a three-digit numeral from 100 to 999), and a file name recorded in the folder is "IMG_####.JPG" (#### is a file number and a four-digit numeral from 0001 to 9999). Thus, they have limitations on the numbers of folders and files which can be created.

Specifically, when files with file numbers up to 9999 are created in a folder, no file number is available in the folder and no further image can be taken.

To address this, Japanese Patent Application Laid-Open No. 10-177646 proposes a camera having a function of defining the number of files which can be created in one folder and automatically creating the next folder to save files in the created folder when the defined number of files is exceeded. In the proposal, however, a folder for saving files is switched to the next one irrespective of the intention of a user, so that files cannot be saved in folders as desired by the user, for example for each scene or date of image-taking. In addition, since file numbers which can be assigned to files on one storage medium correspond to the number compliant with the DCF standard, the number of images which can be taken is limited.

SUMMARY OF THE INVENTION

It is an object of the present invention to provide an image-taking apparatus, an image-taking method, and an image-taking program which allow image data to be saved in folders as desired by a user such as for each scene or date of image-taking and eliminate a limitation on the number of taken images due to a limitation on file numbers.

The present invention provides an image-taking apparatus (an image-taking method and an image-taking program) comprising of an image processing circuit (an image-taking step) which creates image data files based on output from an image-pickup device, and a filing system (a filing step) which saves created image data files in a folder created on a recording medium with a different file number assigned to each image data file and performs a numbering process in which it assigns file numbers sequentially from an initial number. The filing system (the filing step) creates a new folder on the recording medium in accordance with operation of an operating member by a user and starts the numbering process on image data files to be saved in the new folder from the initial number.

The present invention provides an image-taking apparatus (an image-taking method and an image-taking program) comprising of an image processing circuit (an image-taking step) which creates image data files based on output from an image-pickup device, and a filing system (a filing step) which saves created image data files in a folder created on a recording medium with a different file number assigned to each image data file and performs a numbering process in which it assigns file numbers sequentially from an initial number to a predetermined number. The filing system (the filing step) creates a new folder on the recording medium in response to the last assigned file number in the numbering process reaching the predetermined number and starts the numbering process on image data files to be saved in the new folder from the initial number.

The present invention provides an image-taking apparatus (an image-taking method and an image-taking program) comprising of an image processing circuit (an image-taking step) which creates image data files based on output from an image-pickup device, and a filing system (a filing step) which creates a plurality of folders on a recording medium, selectively saves created image data files in one of the plurality of folders with a different file number assigned to each image data file, and performs a numbering process in which it assigns file numbers sequentially from an initial number. The filing system (the filing step) changes a folder for saving image data files for another folder in accordance with operation of an operating member by a user, and starts the numbering process on image data files to be saved in the new folder from the initial number or a number which does not coincide with any file number of the image data file already saved in the new folder.

The present invention provides an image-taking apparatus (an image-taking method and an image-taking program) comprising of an image processing circuit (an image-taking step) which creates image data files based on output from an image-pickup device, and a filing system (a filing step) which creates a plurality of folders on a recording medium, selectively saves created image data files in one of the plurality of folders with a different file number assigned to each image data file, and performs a numbering process in which it assigns file numbers sequentially from an initial number to a predetermined number. The filing system (the filing step) changes a folder for saving image data files for another folder in response to the last assigned file number in the numbering process reaching the predetermined number and starts the numbering process on image data files to be saved in the new folder from the initial number or a number which does not coincide with any file number of the image data file already saved in the new folder.

The present invention provides an image-taking apparatus (an image-taking method and an image-taking program) comprising of an image processing circuit (an image-taking step) which creates image data files based on output from an image-pickup device, and a filing system (a filing step) which saves created image data files in a folder created on a recording medium with a different file number assigned to each image data file and performs a numbering process in which it assigns file numbers sequentially from an initial number to a predetermined number. The filing system (the filing step) performs a folder creating process in which it creates a new folder on the recording medium in response to the last assigned file number in the numbering process reaching the predetermined number, and starts the numbering process on image data files to be saved in the new folder from the initial number. The filing system (the filing step) determines whether or not the folder creating process is performed in accordance with conditions for taking images.

The present invention provides an image-taking apparatus (an image-taking method and an image-taking program) comprising of an image processing circuit (an image-taking step) which creates image data files based on output from an image-pickup device, and a filing system which creates a plurality of folders on a recording medium, selectively saves created image data files in one of the plurality of folders with a different file number assigned to each image data file, and performs a numbering process in which it assigns file numbers sequentially from an initial number to a predetermined number. The filing system (the filing step) performs a folder changing process in which it changes a folder for saving image data files for another folder in response to the last assigned file number in the numbering process reaching the predetermined number and starts the numbering process on image data files to be saved in the new folder from the initial number or a number which does not coincide with any file number of the image data file already saved in the new folder. The filing system determines whether or not the folder changing process is performed in accordance with a condition in taking images.

The features of the image-taking apparatus, the image-taking method, the image-taking program and a storage medium having the image-taking program stored thereon according to the present invention will be apparent from the following description of specific embodiments with reference to the drawings.

DESCRIPTION OF THE PREFERRED EMBODIMENTS

Description is hereinafter made for embodiments of an image-taking apparatus, an image-taking method, an image-taking program, and a computer-readable storage medium of the present invention with reference to the drawings.

Figure 1:
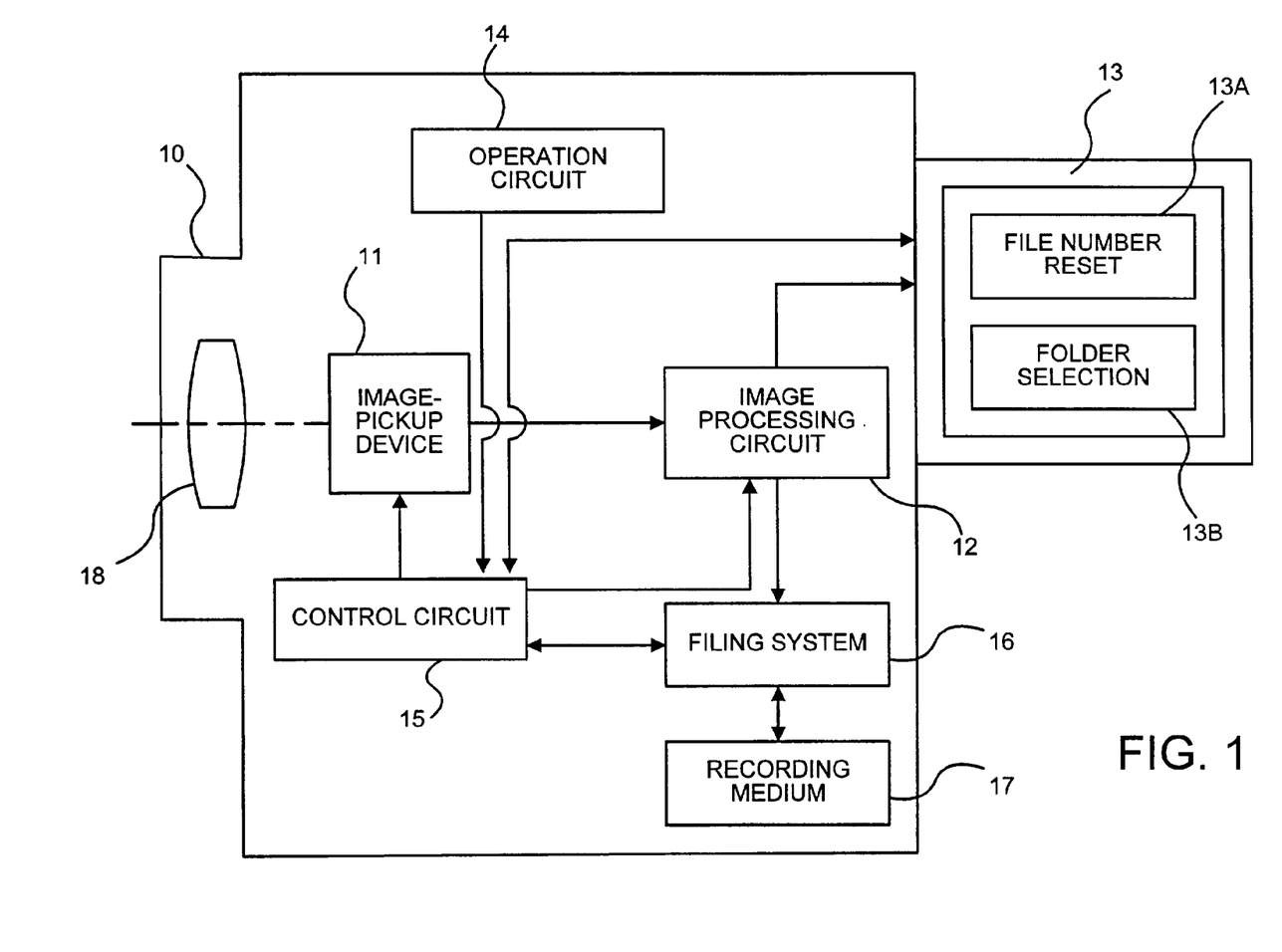
FIG. 1 is a block diagram for explaining the configuration of a digital camera which is an embodiment of the present invention.

FIG. 1 is a block diagram showing the configuration of a digital camera 10 which is an embodiment of the present invention. The camera (image-taking apparatus) 10 takes an image by an image-pickup device 11 performing photoelectric conversion of an object (a subject) image formed by an image-taking lens 18.

An operation circuit 14 is provided with a release switch, various operation buttons and the like, not shown. When a user actuates the release switch to instruct an image-taking operation, a frame of image signal is output from the image-pickup device 11 by a control signal from a control circuit 15 to be formed by a CPU, an MPU or the like.

The image signal output from the image-pickup device 11 is subjected to various image processing and converted into image data in an image processing circuit 12 which receives a control signal from the control circuit 15. Then, the image data is compressed based on a predetermined compression format. In this manner, a file of the image data is created.

A filing system 16 determines a new file name (including file number) to be given to the image data file based on the folder/file configuration in a recording medium 17, and saves the image data file on the recording medium 17.

As the recording medium 17, a semiconductor memory, a magnetic disk, an optical disk and the like may be used.

When taken image data is viewed, the image data recorded with compression on the recording medium 17 is decompressed to original data represented in pixels and the resultant data is transferred to a video memory (not shown) to display an image on a monitor section 13.

On the monitor section 13, GUI (Graphical User Interface) switches (operating members) can also be displayed. The GUI switches herein include a file number reset button 13a and a folder selection button 13b, later described.

Next, description is made for a rule of file numbering (numbering process) performed by the filing system 16. It is possible to select a serial number mode for assigning file numbers specific to the camera regardless of the folder configuration or the kind of the recording medium, or an auto-reset mode for newly assigning file numbers from the beginning when the folder configuration or the recording medium is changed, as representative ones.

As a specific example, a case is considered where the filing system 16 creates a folder on the recording medium 17, records (saves) image data files having file names from IMG__0001.JPG (file number (initial number):0001) to IMG__0010.JPG (file number:0010) in the folder, and then creates another folder to record new image data files within it.

In the serial number mode, a file of IMG_0011.JPG is created subsequent to the file of IMG_0010.JPG in the new folder. On the other hand, in the auto-reset mode, a folder of IMG_0001.JPG with its folder number reset to the initial number is created in the new folder. Switching between the modes is made by operating a mode selection switch (not shown) provided for the operation circuit 14 or formed as one of the GUI switches displayed on the monitor section 13.

In this manner, the filing system 16 performs a folder creating/saving process for creating a folder on the recording medium 17 and saving image data files in the folder and a numbering process for assigning sequentially increased file numbers to the image data files from the initial number "0001" to the maximum number "9999" which are compliant with the DCF standard.

Figure 2:
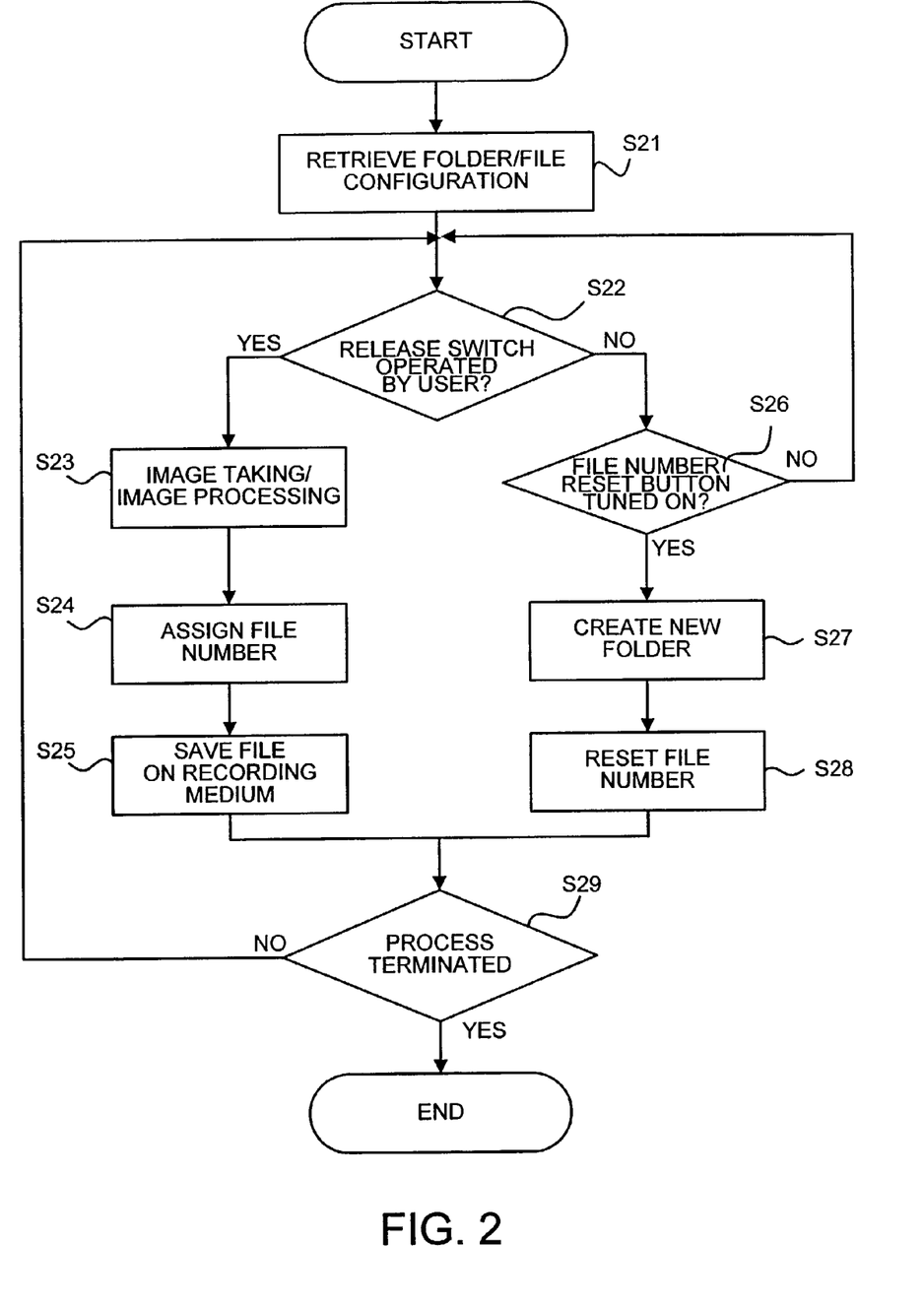
FIG. 2 is a flow chart for explaining the image-taking operation in the digital camera in FIG. 1.

FIG. 2 shows a flow chart for explaining the operation of the digital camera of the embodiment (mainly the operation of the control circuit 15 and the filing system 16).

First, the control circuit 15 sends a control signal to the filing system 16 which then retrieves and stores the folder/file configuration in the recording medium 17 being used (step S21). The control circuit 15 also determines whether the serial number mode or the auto-reset mode is selected. Description is herein made for a case where the auto-reset mode is selected.

Next, at step S22, the control circuit 15 checks the status of the release switch in the operation circuit 14 to determine whether or not a user has operated the release switch. When the result of the determination shows that the user has operated the release switch, the control circuit 15 controls the image-pickup device 11 and the image processing circuit 12 to create an image data file (step S23).

Next, the filing system 16 assigns a file number through the numbering process to the image data file created at step S23 based on the folder/file configuration retrieved at step S21 (step S24). The filing system 16 also saves the image data file in a folder already created on the recording medium 17 through the saving process (step S25).

On the other hand, when it is determined that the user has not operated the release switch at step S22, the control circuit 15 determines whether or not the file number reset button 13a is turned on at step S26. When it is determined that the file number reset button 13a is turned on, the procedure proceeds to step S27 at which the control circuit 15 sends a control signal to the filing system 16. The filing system 16 then creates a new folder on the recording medium 17. When the procedure proceeds to step S25 after the creation of the new folder, an image data file created at step S23 in the next image-taking operation is to be saved in the new folder.

The filing system 16 resets a file number to be assigned to an image data file to be saved in the new folder in the numbering process to "0001" which is the initial number (step S28). With the reset of the file number at this step, file numbers as "0002," "0003," "0004," . . . are assigned to image data files to be saved thereafter in the new folder in the order of save.

Next, at step S29, the control circuit 15 determines whether or not the process is terminated, and when it is determined that the process is not terminated, the procedure returns to step S22 to repeatedly perform the aforementioned operations.

Figure 3:
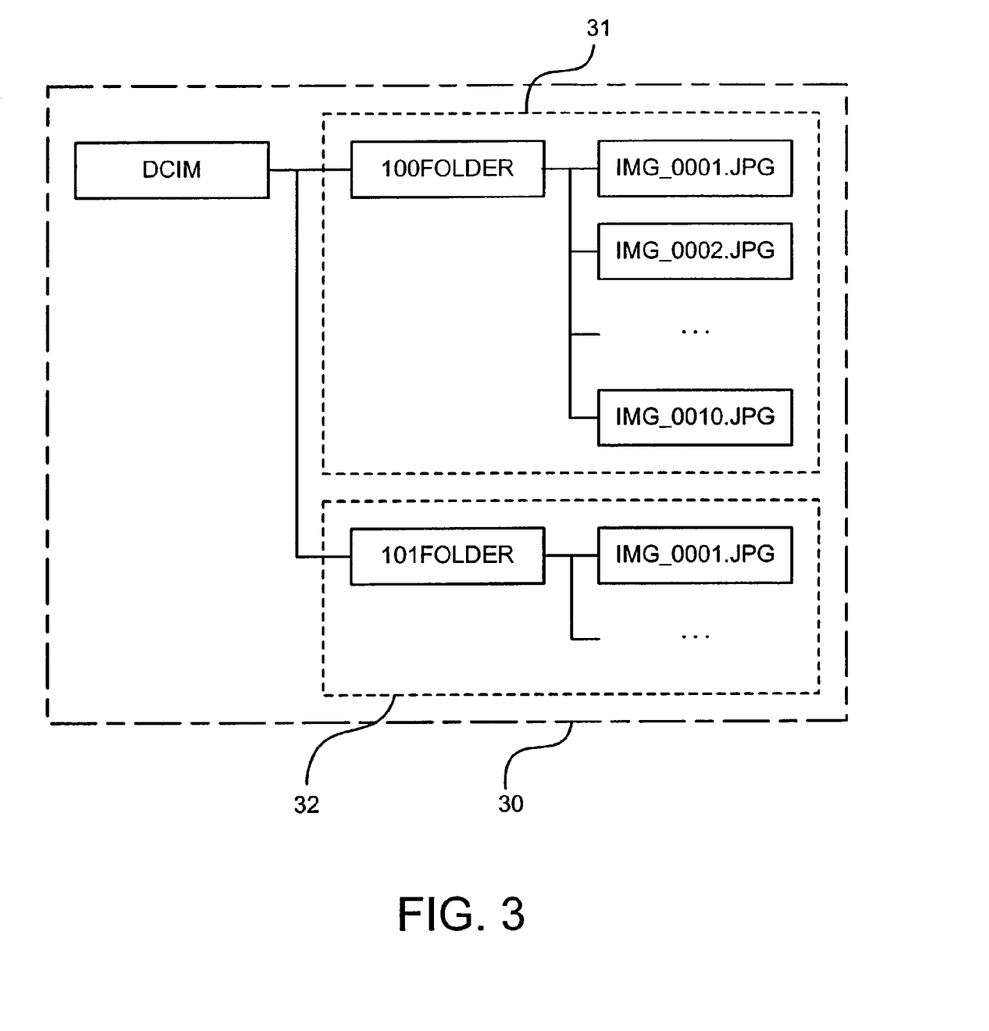
FIG. 3 shows the configuration of folders and files created in the digital camera in FIG. 1.

In the following, description is made for a specific example of the folder/file configuration in the embodiment with reference to FIG. 3. In FIG. 3, a portion surrounded by a box 30 shown by a dash dotted line represents an image recording folder (DCIM) for saving all image data files created on the recording medium 17. A folder for directly saving image data files is created in the image recording folder (DCIM).

A portion surrounded by a box 31 of dotted line shows the folder (100FOLDER) created in the image recording folder (DCIM) before the operation of the file number reset button 13a.

After image data files of IMG_0001.JPG to IMG_0010.JPG, for example, are saved in the folder (100FOLDER), the file number reset button 13a is turned on by a user who takes images of different scenes or takes images at different dates and times. Then, the filing system 16 creates a new folder (101FOLDER) shown by a box 32 of dotted line in the image recording folder (DCIM). Subsequently, the numbering process on image data files to be saved in the folder (101FOLDER) is started from "0001."

Thereafter, each time the file number reset button 13a is turned on, the filing system 16 creates a new folder and resets the file number.

Figure 4:
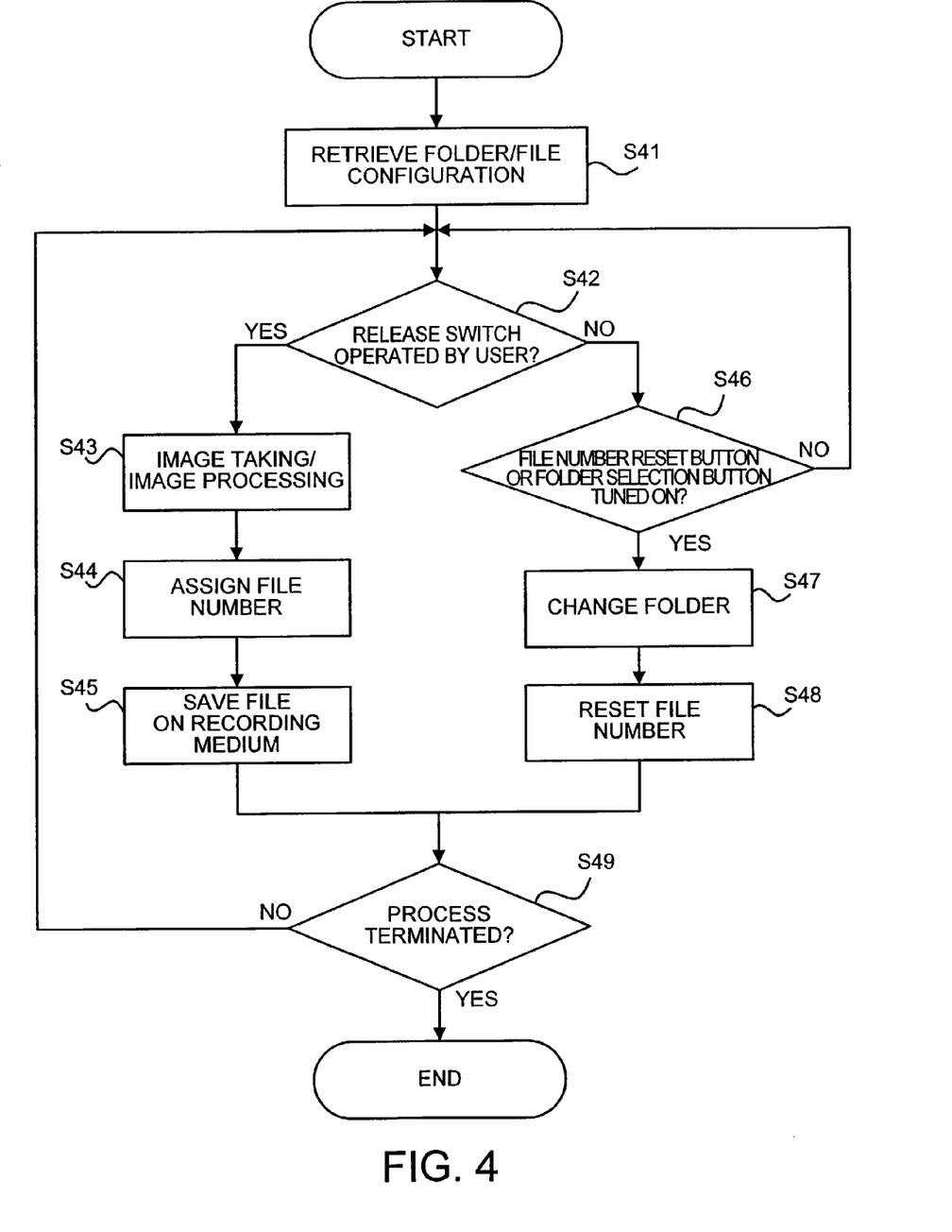
FIG. 4 is a flow chart for explaining the image-taking operation in a digital camera which is another embodiment of the present invention.

FIG. 4 shows a flow chart for explaining the operation of a digital camera of another embodiment of the present invention (mainly the operation of a control circuit 15 and a filing system 16). Since the configuration of the digital camera to which this embodiment is applied is identical to that of the digital camera shown in FIG. 1, common components are designated with the same reference numerals as those in FIG. 1. In this embodiment, however, the filing system 16 creates a plurality of folders on a recording medium 17 in advance, and performs a folder changing/saving process for selectively saving image data files in one of the plurality of folders, and a numbering process for assigning sequentially increased file numbers to image data files from the initial number "0001" to the maximum number "9999" which are compliant with the DCF standard.

First, the control circuit 15 sends a control signal to the filing system 16 which then retrieves and stores a folder/file configuration in the recording medium 17 being used (step S41). The control circuit 15 also determines whether a serial number mode or an auto-reset mode is selected. Description is herein made for a case where the auto-reset mode is selected.

Next, at step S42, the control circuit 15 checks the status of a release switch in an operation circuit 14 to determine whether or not the user has operated the release switch. When it's determined that the user has operated the release switch, the control circuit 15 controls an image-pickup device 11 and an image processing circuit 12 to create an image data file (step S43).

Next, the filing system 16 assigns a file number through the numbering process to the image data file created at step S43 based on the folder/file configuration retrieved at step S41 (step S44). The filing system 16 also saves the image data file in one of a plurality of folders already created on the recording medium 17 through the saving process (step S45). In this step, the filing system 16 saves the image data file in the folder which has the smallest folder number among the folders having no image data file stored therein and the folders having image data files stored therein fewer than the final number ("9999"), or in the folder selected by the user through the operation of the folder selection button 13b which is one of GUI switches among the abovementioned folders being empty and having available space. The folder selection button 13b allows cyclic switching of selected folders each time the button 13b is turned on, by way of example.

On the other hand, when it is determined that the user has not operated the release switch at step S42, the control circuit 15 determines whether or not a file number reset button 13a or the folder selection button 13b is turned on at step S46. When it is determined that the file number reset button 13a is turned on or that the folder selection button 13b is turned on to select a folder different from the folder which is set as the folder for saving image data files at present, the procedure proceeds to step S47 at which the control circuit 15 sends a control signal to the filing system 16. The filing system 16 then changes a folder in which an image data file is to be saved thereafter for the aforementioned empty folder or the folder having available space which has the smallest folder number or is selected by the operation of the folder selection button 13b, of the plurality of folders provided on the recording medium 17. When the procedure proceeds to step S45 after the set of the new folder for saving image data files in this manner, an image data file created at step S43 in the next image-taking operation is to be saved in the set folder.

When the folder set at step S47 is empty, the filing system 16 resets a file number to be assigned to an image data file to be saved in the folder to "0001" which is the initial number in the numbering process (step S48). With the reset of the file number at this step, file numbers as "0002," "0003," "0004," . . . are assigned to image data files to be saved thereafter in the aforementioned set folder.

When the folder set at step S47 has either one or a plurality of image data files already saved therein, the filing system 16 resets a file number to be assigned to an image data file to be saved next in the folder to a number which does not coincide with any file number of the already saved image data file (step S48). For example, when the set folder already has image data files with file numbers up to "0003," file numbers of "0004," "0005," "0006," . . . are subsequently assigned to image data files to be saved thereafter in the set folder due to the reset of the file number.

Next, at step S49, the control circuit 15 determines whether or not the process is terminated, and when it is determined that the process is not to be terminated, the procedure returns to step S42 to repeatedly perform the aforementioned operation.

Figure 5:
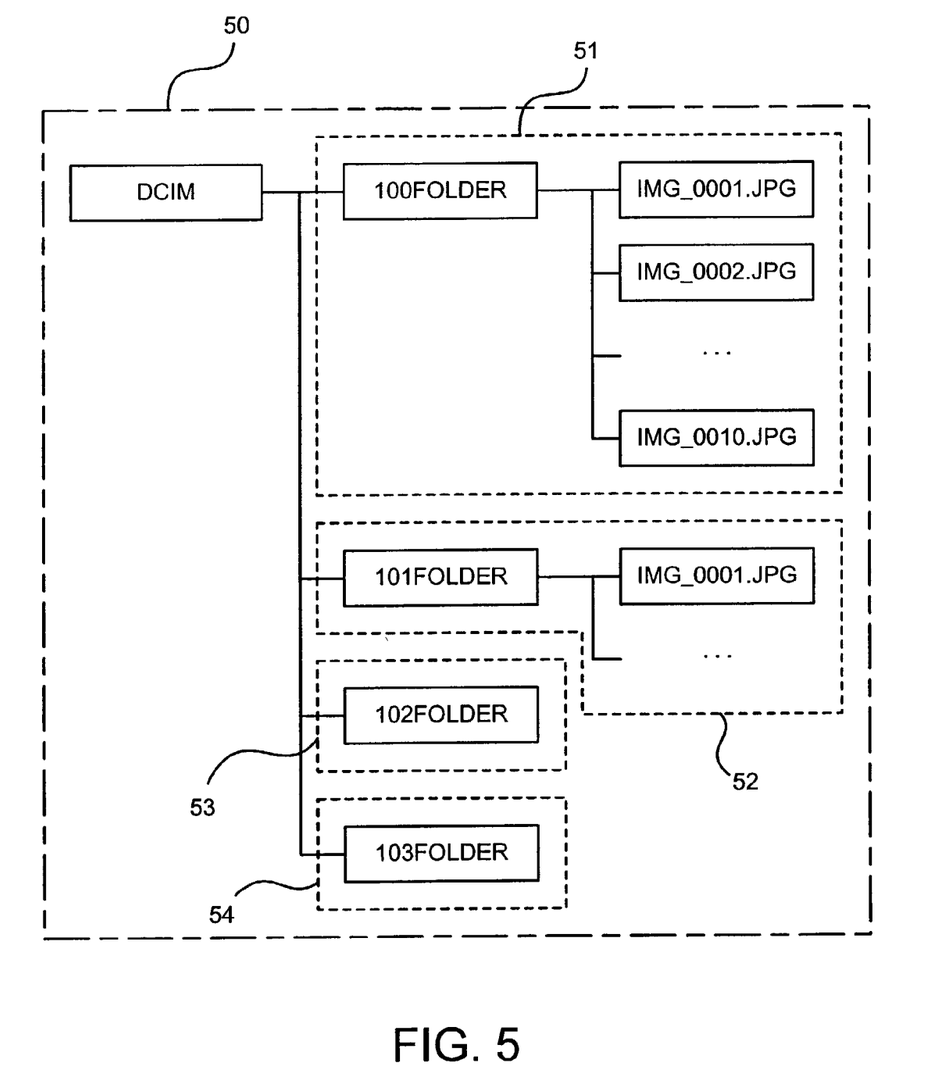
FIG. 5 shows the configuration of folders and files created in the digital camera in FIG. 4.

In the following, a description is made for a specific example of the folder/file configuration in the embodiment with reference to FIG. 5. In FIG. 5, a portion surrounded by a box 50 shown by a dash dotted line represents an image recording folder (DCIM) for saving all image data files created on the recording medium 17. A plurality of folders (100FOLDER to 103FOLDER) surrounded by boxes 51 to 54 of dotted line are created for directly saving image data files in the image recording folder (DCIM).

After image data files of IMG_0001.JPG to IMG_0010.JPG, for example, are saved in the folder (100FOLDER), the file number reset button 13a is turned on by a user who takes images of different scenes or takes images at different dates and times. Then, the filing system 16 selects one of the other empty folders (101FOLDER to 103FOLDER) which has the smallest folder number (101FOLDER in this case), by way of example. Subsequently, the numbering process on image data files to be saved in the folder (101FOLDER) is started from "0001."

Although not shown in FIG. 5, when the folder selection button 13b is operated to select the folder (101FOLDER) and the folder (101FOLDER) already has image data files of IMG_0001.JPG to IMG_0003.JPG, for example, the filing system 16 starts the numbering process on image data files to be saved subsequently in the folder (101FOLDER) from "0004."

Thereafter, each time at which the file number reset button 13a is turned on or the folder selection button 13b is turned on to change a folder for saving image data files, the filing system 16 changes a folder in which an image data file is next stored and resets the file number.

As described above, in the digital camera in the embodiments shown in FIGS. 1 to 3 and FIGS. 4 and 5, the folder for saving image data files is newly created on the recording medium or selected from the existing folders, and the file number is reset, in accordance with an arbitrary operation of the user. It is thus possible to save image data files in folders as desired by the user for each scene or date of image-taking.

Figure 6:
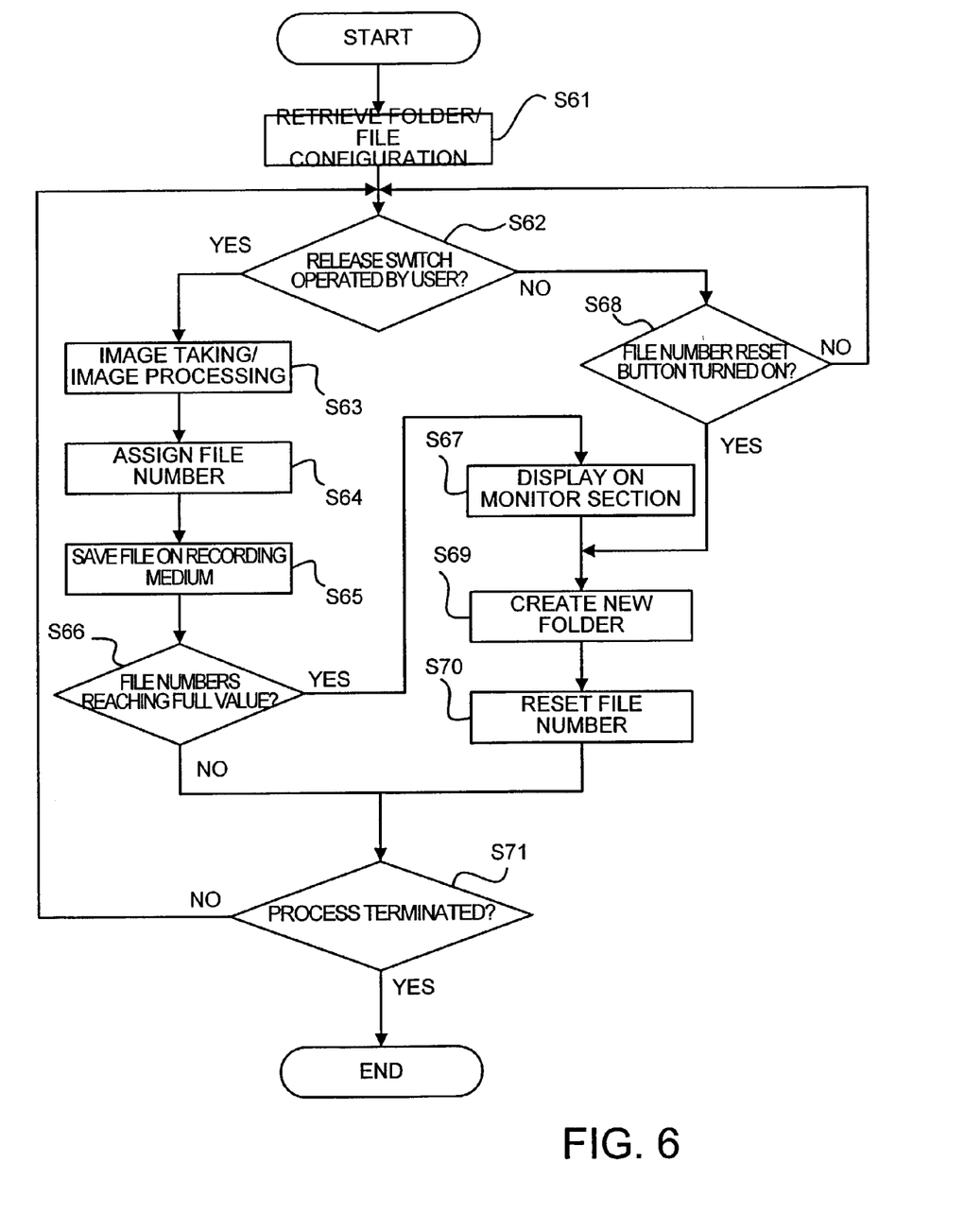
FIG. 6 is a flow chart for explaining the image-taking operation in a digital camera which is a further embodiment of the present invention.

FIG. 6 shows a flow chart for explaining the operation of a digital camera of a further embodiment of the present invention (mainly the operation of a control circuit 15 and a filing system 16). In this embodiment, a new folder is automatically created when the number of image data files saved in one folder (file number) reaches "9999" which is the maximum number (predetermined number) compliant with the DCF standard. Since the configuration of the digital camera to which this embodiment is applied is identical to that of the digital camera shown in FIG. 1, common components are designated with the same reference numerals as those in FIG. 1.

The filing system 16 in this embodiment performs a folder creating/saving process for creating a folder on a recording medium 17 and saving image data files in the folder, and a numbering process for assigning sequentially increased file numbers to image data files from the initial number "0001" to the maximum number "9999" which are compliant with the DCF standard.

First, the control circuit 15 sends a control signal to the filing system 16 which then retrieves and stores a folder/file configuration in the recording medium 17 being used (step S61). The control circuit 15 also determines whether a serial number mode or an auto-reset mode is selected. Description is herein made for a case where the auto-reset mode is selected.

Next, at step S62, the control circuit 15 checks the status of a release switch in an operation circuit 14 to determine whether or not a user has operated the release switch. When it's determined that the user has operated the release switch, the control circuit 15 controls an image-pickup device 11 and an image processing circuit 12 to create an image data file (step S63).

Next, the filing system 16 assigns a file number through the numbering process to the image data file created at step S63 based on the folder/file configuration retrieved at step S61 (step S64). The filing system 16 also saves the image data file in a folder already created on the recording medium 17 through the saving process (step S65).

In addition, the filing system 16 determines whether or not the file number last assigned to the image data file stored in the aforementioned folder is the maximum number (reaches the full value), that is, whether or not there is any remaining file number available for assignment (step S66).

When it's determined that the file number reaches the maximum number, the filing system 16 sends the control circuit 15 a signal indicating that fact. The control circuit 15 displays on the monitor section 13 the fact that the file number has reached the full value and that a new folder is to be created (step S67). Then, the procedure proceeds to step S69.

On the other hand, when it is determined that the user has not operated the release switch at step S62, the procedure proceeds to step S68 at which the control circuit 15 determines whether or not a file number reset button 13a is turned on. When it is determined that the file number reset button 13a is turned on, the procedure proceeds to step S69.

At step S69, the control circuit 15 sends a control signal to the filing system 16. The filing system 16 then creates a new folder on the recording medium 17. When the procedure proceeds to step S65 after the creation of the new folder, an image data file created at step S63 in the next image-taking operation is to be saved in the new folder.

The filing system 16 resets a file number to be assigned to the image data file to be saved in the new folder in the numbering process to "0001" which is the initial number (step S70). With the reset of the file number at this step, file numbers as "0002," "0003," "0004," . . . are assigned to image data files to be saved thereafter in the new folder in the order of save.

Next, at step S71, the control circuit 15 determines whether or not the process is terminated, and when it is determined that the process is not terminated, the procedure returns to step S62 to repeatedly perform the aforementioned operation.

Figure 7:
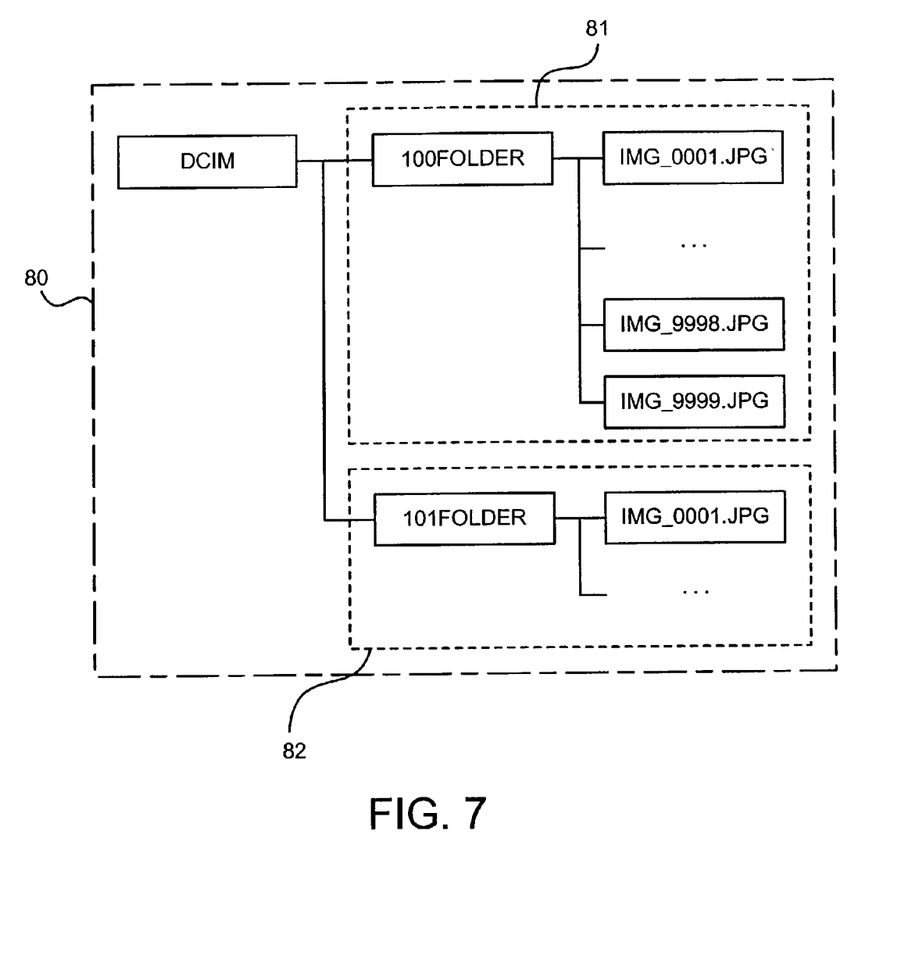
FIG. 7 shows the configuration of folders and files created in the digital camera in FIG. 6.

In the following, description is made for a specific example of the folder/file configuration in the embodiment with reference to FIG. 7. In FIG. 7, a portion surrounded by a box 80 indicated by a dash dotted line represents an image recording folder (DCIM) for saving all image data files created on the recording medium 17. Folders for directly saving image data files are created in the image recording folder (DCIM).

A portion surrounded by a box 81 of dotted line shows a folder (100FOLDER) created in the image recording folder (DCIM) before the file number reaches the full value or before the file number reset button 13a is operated. Description is hereinafter made for a case where the file number reaches the full value. The operation when the file number reset button 13a is operated is identical to that in the embodiment shown in FIG. 1.

When image data files of IMG_0001.JPG to IMG_9999.JPG are saved in the folder (100FOLDER) (that is, when the file number reaches "9999"), the filing system 16 automatically creates a new folder (101FOLDER) shown by a box 82 of dotted line in the image recording folder (DCIM). Subsequently, the numbering process on image data files to be saved in the folder (101FOLDER) is started from "0001."

Thereafter, each time at which the file number last assigned to image data file saved in one folder reaches the full value, the filing system 16 creates a new folder and resets the file number.

The embodiment has been described for the automatic creation of the new folder and the reset of the folder number when the file number reaches the full value. Alternatively, at step S67 in FIG. 6, a warning operation may be performed such as display of the file number reaching the full value on the monitor section 13 or generation of a warning sound to prompt a user to reset the file number such that the new folder creation and the folder number reset are performed in response to turn-on of the file number reset button 13a by the user seeing or hearing the warning.

It is possible to set whether the new folder creation (folder creating process) and the folder number reset are performed in response to turn-on of the file number reset button 13a or performed automatically as described above depending on the operation for selection by a user.

In addition, it is possible to change whether the new folder creation and the folder number reset are performed in response to turn-on of the file number reset button 13a or performed automatically as described above in accordance with conditions in taking images.

Specifically, when the file number reaches the full value in a continuous image-taking mode, the new folder creation and the file number reset may be automatically performed to continue image-taking. In a single image-taking mode, image-taking may be prohibited to wait for turn-on of the file number reset button 13a by the user.

Figure 8:
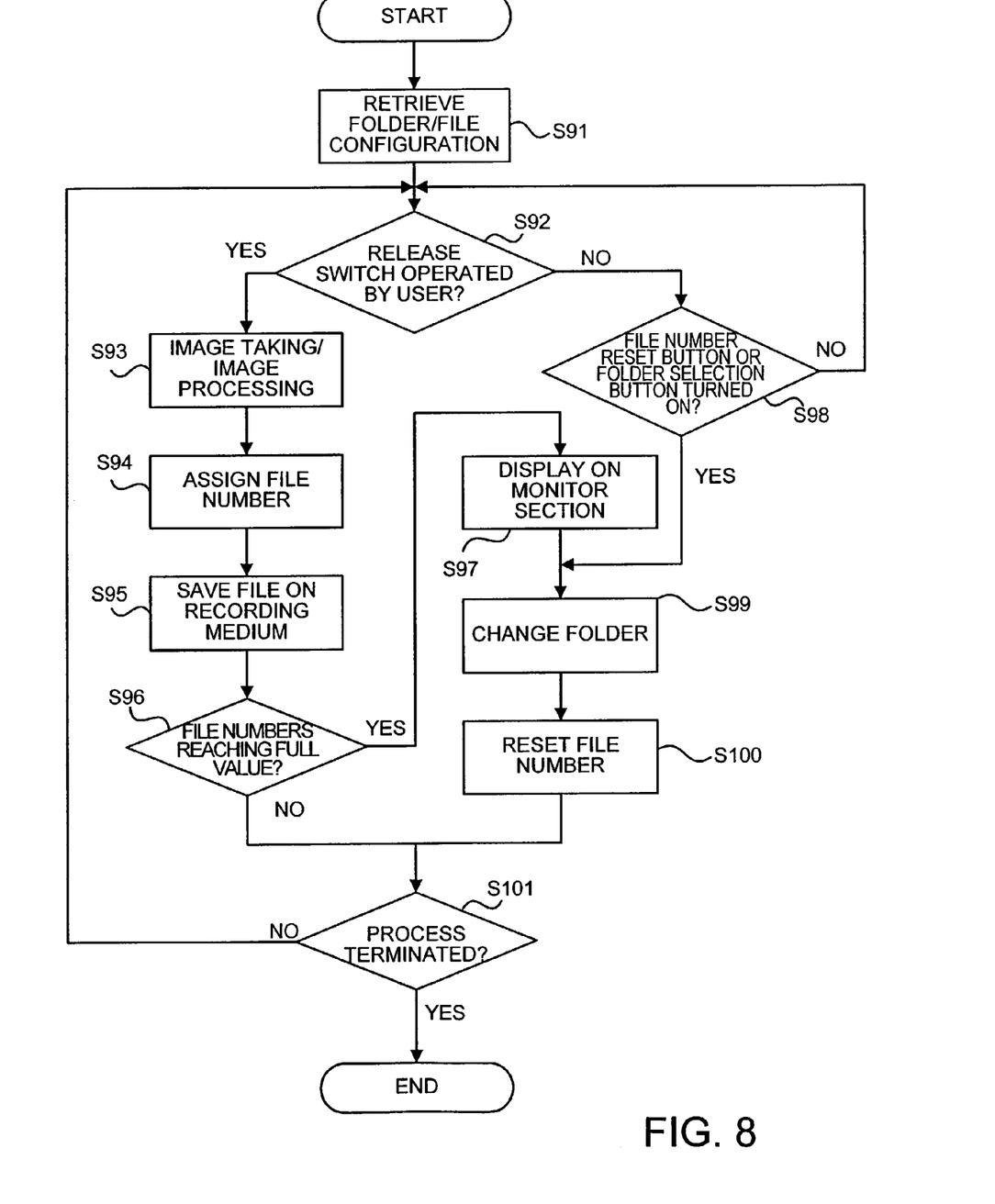
FIG. 8 is a flow chart for explaining the image-taking operation in a digital camera which is a still further embodiment of the present invention.

FIG. 8 shows a flow chart for explaining the operation of a digital camera of a still further embodiment of the present invention (mainly the operation of a control circuit 15 and a filing system 16). In this embodiment, when the number of image data files which are saved in one folder (file number) reaches "9999" which is the maximum number (predetermined number) compliant with the DCF standard, a folder for saving image data files is automatically changed for another folder. Since the configuration of the digital camera to which this embodiment is applied is identical to that of the digital camera shown in FIG. 1, common components are designated with the same reference numerals as those in FIG. 1.

The filing system 16 in this embodiment performs a changing/saving process for creating a plurality of folders on a recording medium 17 and selectively saving image data files in one of the plurality of folders, and a numbering process for assigning sequentially increased file numbers to image data files from the initial number "0001" to the maximum number "9999" which are compliant with the DCF standard.

First, the control circuit 15 sends a control signal to the filing system 16 which then retrieves and stores a folder/file configuration in the recording medium 17 being used (step S91). The control circuit 15 also determines whether a serial number mode or an auto-reset mode is selected. Description is herein made for a case where the auto-reset mode is selected.

Next, at step S92, the control circuit 15 checks the status of a release switch in an operation circuit 14 to determine whether or not user has operated the release switch. When it's detemined that the user has operated the release switch, the control circuit 15 controls an image-pickup device 11 and an image processing circuit 12 to create an image data file (step S93).

Next, the filing system 16 assigns a file number through the numbering process to the image data file created at step S93 based on the folder/file configuration retrieved at step S91 (step S94). The filing system 16 also saves the image data file in one of the plurality of folders already created on the recording medium 17 through the saving process (step S95). In this step, the filing system 16 saves the image data file in the folder which has the smallest folder number among the folders having no image data file stored therein and the folders having image data files stored therein fewer than the final number ("9999"), or in the folder that is selected by the user through the operation of a folder selection button 13b which is one of GUI switches among the abovementioned folders being empty or having available space. The folder selection button 13b allows cyclic switching of selected folders each time the button 13b is turned on, by way of example.

In addition, the filing system 16 determines whether or not the file number last assigned to the image data file stored in the folder being used reaches the maximum number (the full value), that is, whether or not there is any remaining file number available for next assignment (step S96).

When it's determined that the file number reaches the maximum number, the filing system 16 sends the control circuit 15 a signal indicating that fact. The control circuit 15 displays on a monitor section 13 the fact that the file number reaches the full value and that a folder in which an image data file is to be saved is changed for another folder (step S97). Then, the procedure proceeds to step S99.

On the other hand, when it is determined that the user has not operated the release switch at step S92, the procedure proceeds to step S98 at which the control circuit 15 determines whether a file number reset button 13a or the folder selection button 13b is turned on. When it is determined that the file number reset button 13a is turned on or that the folder selection button 13b is turned on to select a folder different from the folder which is set as the folder for saving image data files at present, the procedure proceeds to step S99.

At step S99, the control circuit 15 sends a control signal to the filing system 16. The filing system 16 then changes a folder for saving image data files thereafter for the aforementioned empty folder or the folder having available space which has the smallest folder number or is selected by the operation of the folder selection button 13b, of the plurality of folders provided on the recording medium 17. When the procedure proceeds to step S95 after the set of the new folder for saving image data files in this manner, an image data file created at step S93 in the next image-taking operation is to be saved in the set folder.

When the folder set at step S99 is empty, the filing system 16 resets a file number to be assigned to an image data file to be saved in that folder to "0001" which is the initial number in the numbering process (step S100). With the reset of the file number at this step, file numbers as "0002," "0003," "0004," . . . are assigned to image data files to be saved thereafter in the selected folder.

When the folder set at step S99 has one or a plurality of image data files already saved therein, the filing system 16 resets a file number to be assigned to an image data file to be saved next in that folder to a number which does not coincide with any file number of the already saved image data file (step S100). For example, when the selected folder already has image data files with file numbers up to "0003," file numbers of "0004," "0005," "0006," . . . are subsequently assigned to image data files to be saved thereafter in the selected folder due to the reset of the file number.

Next, at step S101, the control circuit 15 determines whether or not the process is terminated, and when it is determined that the process has not terminated, the procedure returns to step S92 to repeatedly perform the aforementioned operation.

Figure 9:
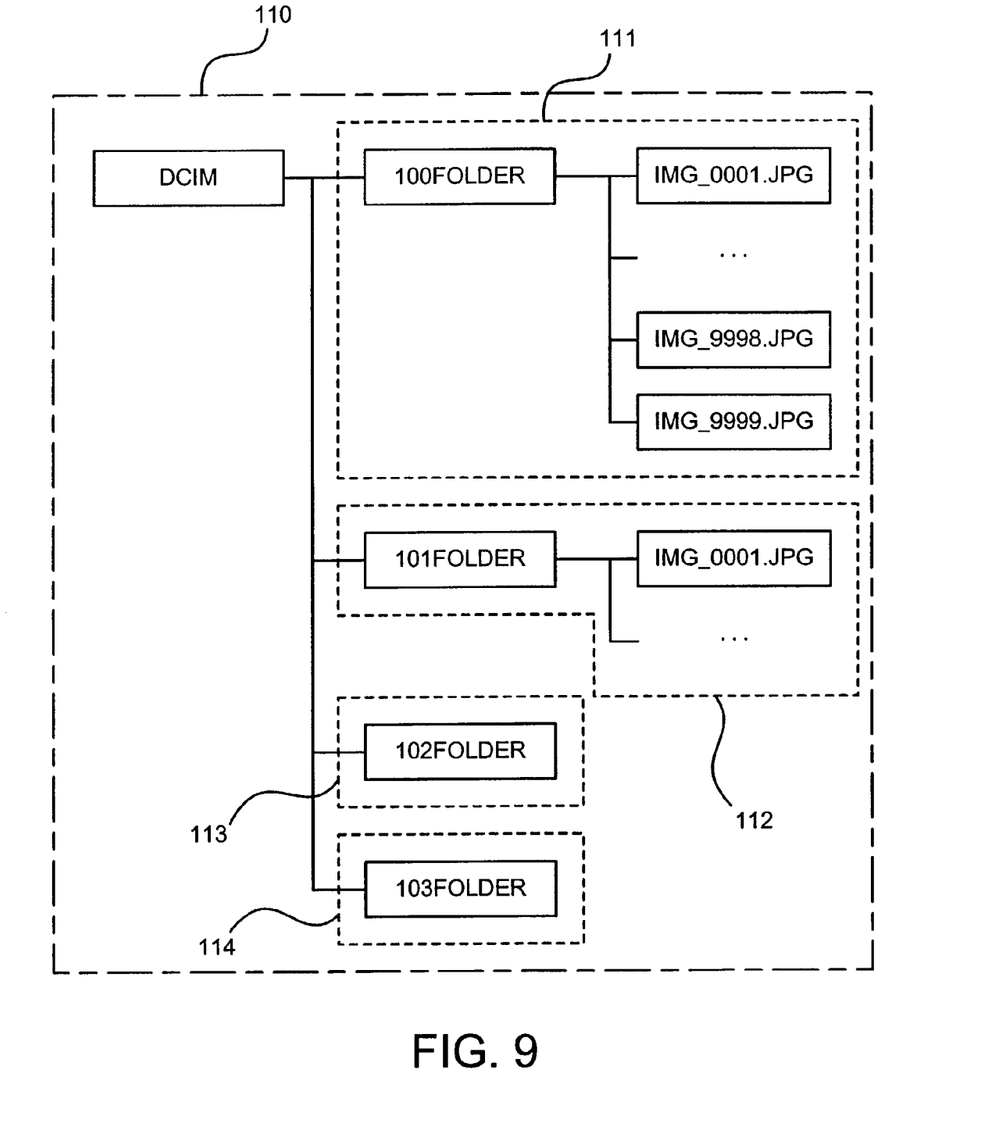
FIG. 9 shows the configuration of folders and files created in the digital camera in FIG. 8.

In the following, description is made for a specific example of the folder/file configuration in the embodiment with reference to FIG. 9. In FIG. 9, a portion surrounded by a box 110 indicated by a dash dotted line represents an image recording folder (DCIM) for saving all image data files created on the recording medium 17. A plurality of folders (100FOLDER to 103FOLDER) surrounded by boxes 111 to 114 of dotted line are created for directly saving image data files in the image recording folder (DCIM).

When image data files of IMG_0001.JPG to IMG_9999.JPG are saved in the folder (100FOLDER) and the file number reaches the full number ("9999"), the filing system 16 selects one of the other empty folders (101FOLDER to 103FOLDER) that has the smallest folder number (101FOLDER in this case), by way of example. Subsequently, the numbering process on image data files to be saved in the folder (101FOLDER) is started from "0001."

Although not shown in FIG. 9, when the folder selection button 13b is operated to select the folder (101FOLDER), and the folder (101FOLDER) already has image data files of IMG_0001.JPG to IMG_0003.JPG, for example, the filing system 16 starts the numbering process on image data files to be saved subsequently in the folder (101FOLDER) from "0004."

Thereafter, each time at which the file number reset button 13 is turned on or the fold selection button 13b, or the folder selection button 13b is used to change a folder for saving image data files, the filing system 16 changes a folder in which an image data file is next stored and resets the file number.

The embodiment has been described for the automatic change of the folder for saving files and the reset of the folder number when the file number reaches the full value. Alternatively, at step S97 in FIG. 8, a warning operation may be performed such as display of the file number reaching the full value on the monitor section 13 or generation of a warning sound to prompt a user to reset the file number such that the folder change and the folder number reset are performed in response to turn-on of the file number reset button 13a by the user seeing or hearing the warning.

It is possible to set whether the folder change and the folder number reset are performed in response to turn-on of the file number reset button 13a or performed automatically as described above depending on the operation for selection by a user.

In addition, it is possible to change whether the folder change (folder changing process) and the folder number reset are performed in response to turn-on of the file number reset button 13a or performed automatically as described above in accordance with conditions in taking images.

Specifically, when the file number reaches the full value in a continuous image-taking mode, the folder change and the file number reset may be automatically performed to continue image-taking. In a single image-taking mode, image-taking may be prohibited to wait for turn-on of the file number reset button 13a by the user.

As described above, in the digital cameras of the embodiments shown in FIGS. 6, 7 and FIGS. 8, 9, the folder for saving image data files is newly created on the recording medium or is newly selected from the existing folders, and the file number is reset, in response to the file number reaching the full value. It is thus possible to eliminate a limitation on the number of taken images due to a limitation on the file numbers.

An image-taking program associated with each of the flow charts described in the respective embodiments can be stored in a RAM or ROM in the control circuit 15 and the filing system 16 in the process of manufacturing the digital cameras. Alternatively, the image-taking program may be provided for a user by downloading it through the Internet, or by storing it on a storage medium such as a CD-ROM, flexible disk, magnetic tape, magneto-optic disk, or non-volatile memory card. The user may store the program on a writable or rewritable memory in the control circuit 15 and the filing system 16 through a personal computer or a memory write device to subsequently operate the digital camera in accordance with the written program.

In addition, part of the image-taking program associated with the image-taking step (for example, steps S21 to S25 in FIG. 2) is executed by the digital camera, while part of the program associated with the filing step (for example, steps S26 to S28 in FIG. 2) is written on a hard disk of a personal computer or the like to allow the personal computer to be used as a filing apparatus of image data.

The program may work with the OS (Operating System), another application software or the like running on a computer to realize the features of the aforementioned embodiments, or all or some of the processing of the provided program may be executed by a function expansion board or a function expansion unit of a computer to realize the features of the aforementioned embodiments. In either case, the program is included in the embodiments of the present invention.

All or some of the program may be executed by another computer to use the present invention in a network environment. For example, image input processing may be performed by a remote terminal computer, while various determinations, log recording and the like may be performed by another center computer or the like.

While preferred embodiments have been described, it is to be understood that modification and variation of the present invention may be made without departing from the sprit or scope of the following claims.

What is claimed is:

1. An image-taking apparatus comprising:
   an image-pickup device which photoelectrically converts an object image;
   an image processing circuit which creates image data files based on output from the image-pickup device;
   a filing system which creates a plurality of folders on a recording medium, selectively saves the image data files created by the image processing circuit in one of the plurality of folders with a different file number assigned to each image data file, and performs a numbering process in which it assigns file numbers sequentially from an initial number; and
   an operating member which is operated by a user,
   wherein the filing system changes a folder for saving image data files to other folder in accordance with operation of the operating member, and starts the numbering process on image data files to be saved in the other folder from the initial number or a number which does not coincide with any file number of the image data file already saved in the other folder, and
   wherein the other folder is a folder which has the smallest folder number among the folders having no image data file stored therein and the folders having image data files stored therein fewer than a final number.

2. An image-taking method comprising:
   an image-taking step of creating image data files based on output from an image-pickup device which photoelectrically converts an object image; and
   a filing step of creating a plurality of folders on a recording medium, selectively saving the image data files created at the image-taking step in one of the plurality of folders with a different file number assigned to each image data file, and performing a numbering process in which it assigns file numbers sequentially from an initial number,
   wherein the filing step includes changing a folder for saving image data files to other folder in accordance with operation of a specific operating member and starting the numbering process on image data files to be saved in the other folder from the initial number or a number which does not coincide with any file number of the image data file already saved in the other folder, and
   wherein the other folder is a folder which has the smallest folder number among the folders having no image data file stored therein and the folders having image data files stored therein fewer than a final number.

* * * * *